Nov. 16, 1937.   D. F. SEARLE   2,099,453
AIR BRAKE CONTROL SYSTEM
Filed April 12, 1937   2 Sheets-Sheet 1

INVENTOR:
DUDLEY F. SEARLE
BY Baldwin Yale
ATTORNEY.

Nov. 16, 1937.  D. F. SEARLE  2,099,453
AIR BRAKE CONTROL SYSTEM
Filed April 12, 1937  2 Sheets-Sheet 2

INVENTOR:
DUDLEY F. SEARLE
BY
ATTORNEY

Patented Nov. 16, 1937

2,099,453

UNITED STATES PATENT OFFICE 2,099,453

AIR BRAKE CONTROL SYSTEM

Dudley F. Searle, Oakland, Calif.

Application April 12, 1937, Serial No. 136,400

7 Claims. (Cl. 303—39)

This invention relates to improvements in power brake control systems and more particularly to brake systems for tractor and trailer combinations.

Among the objects of the invention is to automatically and fully apply and lock the trailer brakes in the event of the trailer becoming accidentally uncoupled from the tractor.

Another object is to obviate the necessity for relying upon the equipment being leakproof in order to hold the brakes fully applied after the trailer breaks away.

Another object is to enable the use of the automatic brake lock as a parking lock operable at the will of the driver.

Other objects and advantages appear as this description progresses.

In this specification and the accompanying drawings the invention is disclosed in its preferred form. It is to be understood, however, that it is not limited to this form because it may be embodied in other forms within the spirit of the invention as defined in the claims following the description.

In the accompanying two sheets of drawings:

Figs. 1 and 2, to be read in conjunction with each other, are schematic diagrams principally in side elevation illustrating a brake system constructed in accordance with this invention.

Figure 2:
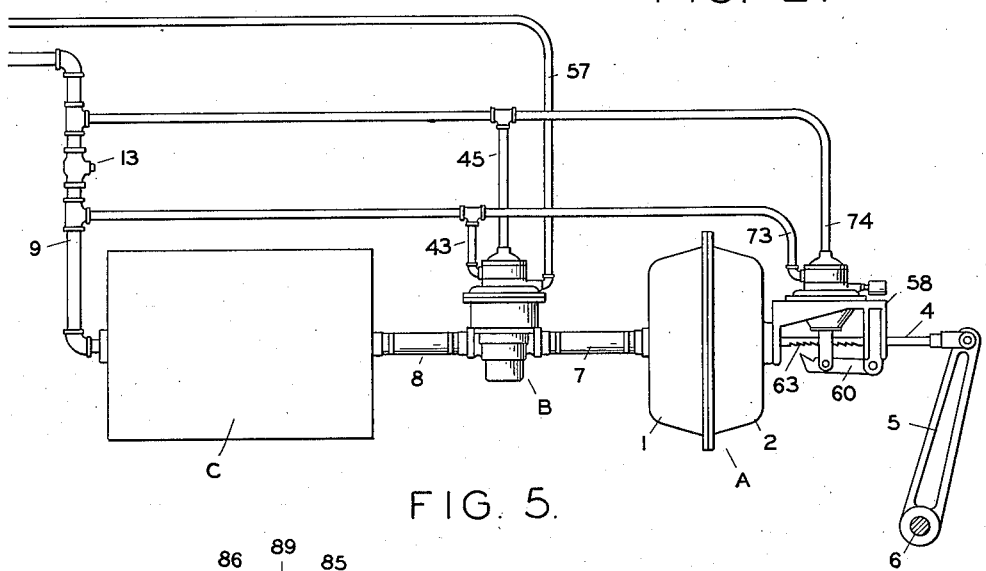
Figure 4:
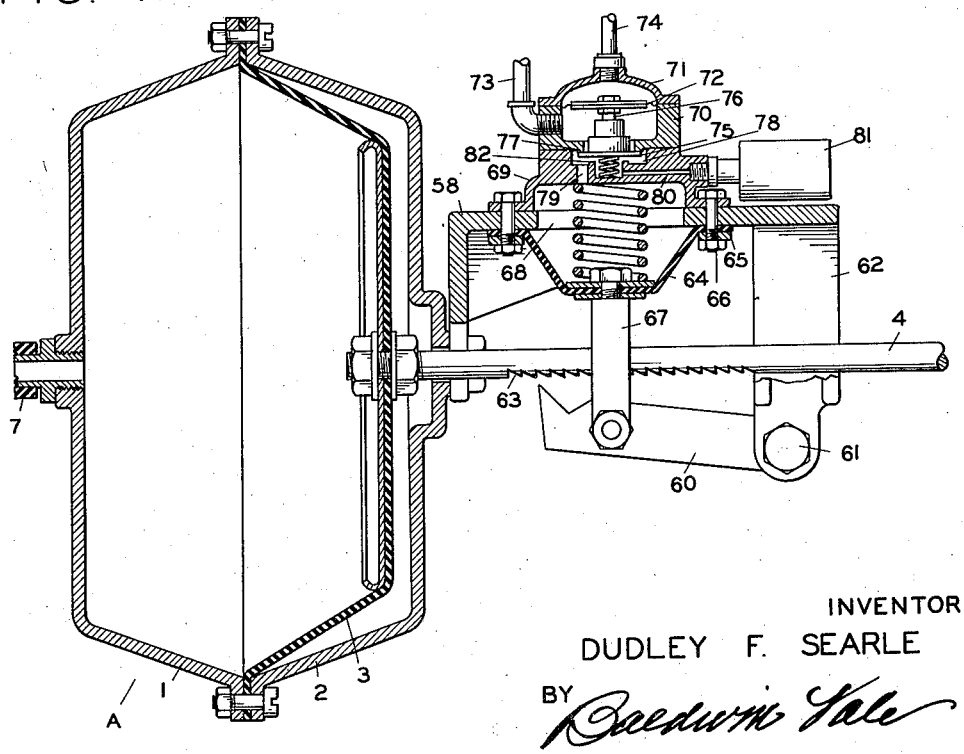
Fig. 4 is a similar view of the brake lock and its control valve.

In detail, the construction illustrated in the drawings, referring more particularly to Figs. 2 and 4, comprises the power chamber A on the trailer formed by the shells 1 and 2 having their opposed flanges bolted together with the flexible diaphragm 3 therebetween. The pull rod 4 is attached to the diaphragm 3 in the usual manner and has its opposite end operatively connected to the lever 5 pivoted on the rod 6. The lever 5 controls the brake system of the trailer by the usual means (not shown).

The hose 7 connects the interior of the shell 1 to the triple valve B. The opposite side of the triple valve B is connected to the pressure reservoir C by the hose 8. When the brake system is in the normal released condition, the triple valve B is closed to the reservoir C. The power chamber A remains at atmospheric pressure until the triple valve B provides communication therefrom to the reservoir C. The reservoir C is connected through the pipe 9 on the trailer, the detachable coupling 10 between the trailer and the tractor, and the pipes 11', 11 on the tractor to a suitable source of pressure. In the present instance, the subatmospheric pressure of the intake manifold 12 of the combustion motor is utilized.

The check valve 13 is interposed in the pipe 9 and prevents loss of pressure from the reservoir C should the coupling be broken. The check valve 14 is interposed in the pipe 11 and prevents fluctuations of pressure within the intake manifold 12 from being transmitted to the brake control system and adversely affecting its operation. The plug valve D is interposed between the pipes 11, 11' on the tractor for purposes later to be described. It is open to permit unobstructed flow of pressure between the pipes 11, 11' throughout the normal operation of the system.

Figure 1:
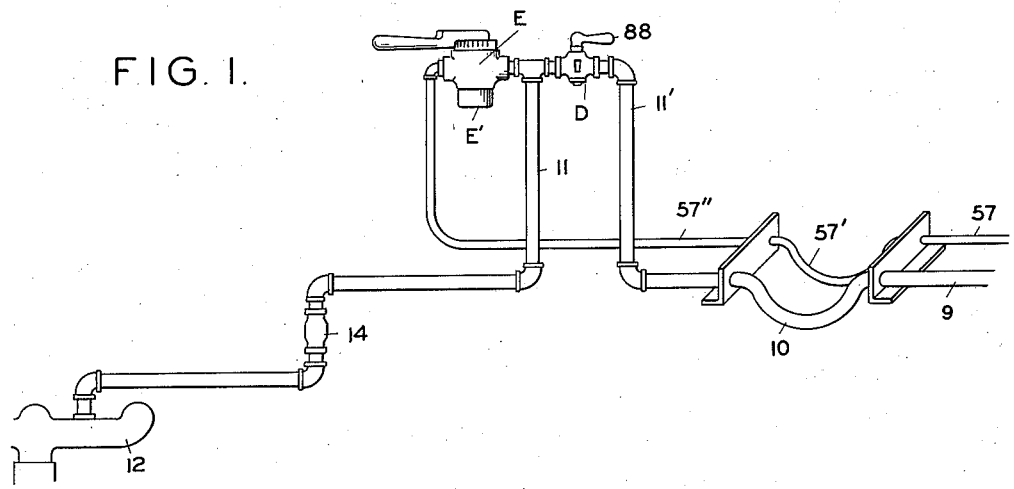

The triple valve B (see Fig. 3) comprises the body 15 having the base portion 16 with the lateral outlets 17 and 18 therein connected to the chamber A and the reservoir C respectively, as in Fig. 1. These outlets have the throats 19 and 20 leading upwardly therefrom and discharging into the interior of the body 15. The entrance of the throat 20 is surrounded by the annular valve seat 21, with which the disc valve 22 is normally engaged, cutting off the reservoir outlet 18 from communication with the interior of the body 15. The valve 22 is held in seated position by the pressure differential against its opposite sides.

The passage 23 communicates with the throat 19 and leads downwardly through the base 16 to the atmosphere. The air cleaner 24 is attached to the base 16 and has the fibrous filter 25 therein to prevent the entry of dirt into the passage 23. The disk valve 26 has the stem 27 slidable within the tube 28 centrally located within the base 16. This valve is adapted to cooperate with the seat 29 to close the passage 23 from communication with the atmosphere. The spring 26' expands between the air cleaner 24 and the valve 26 and urges the valve into engagement with the seat 29. The diaphragm 30 is interposed between the abutting flanges of the body 15 and the top 31 bolted thereto. The central portion of the diaphragm 29 is clamped between the discs 32, 32 by the nuts 33 and 34 threaded on the plunger 35. The lower portion of the plunger 35 is slidable within the tube 28 and operatively engages the top of the stem 27. The arm 36 is fixed on the plunger 35 and slidably engages the stem 37 of the disk valve 22. The cotter pin 38 is provided in the stem 37 above the plane of the arm 36. The arm 36 is arranged to unseat the valve 22 when it engages the pin 38 in the course of its upward movement.

The control means for the triple valve above described comprises the hollow body 39 fixed on the top 31, and having the superimposed cover 40. The diaphragm 41 is interposed between the body 39 and the cover 40. The body has the outlet 42 which is connected by the pipe 43 to the pipe 9 between the reservoir C and the check valve 13.

The outlet 44 in the cover 40 is connected by the pipe 45 to the pipe 9 on the opposite side of the check valve 13, see Fig. 1. Since equal pressures normally exist on opposite sides of the check valve 13, there is usually no pressure differential applied against the diaphragm 41.

The top 31 has the cavity 46 in the upper portion thereof. The opening 47 in the hollow body 39 is adapted to communicate with the cavity 46 and is surrounded by the seat 48. The disc valve 49 is adapted to cooperate with the seat 48 and is attached to the diaphragm 41 by the plunger 50 which is screwed into the head 51. The spring 52 in the recess 53 in the top 31 expands against the disc valve 49 and seats it at 48. The passage 54 provides communication between the interior of the top 31 above the diaphragm 29 and the cavity 46. The valve seat 55 encircles the top of the recess 53. The valve 49 is adapted to seat at 55 when moved downwardly by the diaphragm 41 cutting off the passage 54 from communication with the interior of the recess 53. The passage 56 leads laterally from the recess 53 and is connected through the pipe 57, the detachable coupling 57′, and the pipe 57″ to the manual control valve E; see Fig. 1. This valve is connected to the intake manifold 12 through the pipe 11. It communicates with the atmosphere through the air cleaner E′. The control valve E is conventional in construction and operation. Reference may be had to the control valve disclosed in my co-pending application #124,621 which is particularly suited for use in conjunction with the present system.

The brake lock comprises the plate 58 bolted on to the chamber A, (see Fig. 4). The pawl 60 is pivoted at 61 on the yoke 62 extending downward from the plate 58. It is engageable with the under-cut ratchet teeth 63 which are provided in the underside of the rod 4. The collapsible cup 64 has its margins sealed to the plate 58 by the ring 65 bolted thereto. It is operatively connected to the pawl 60 by the clevis 67.

The plate 58 has the large opening 68 therethrough registering with the interior of the collapsible cup 64. The base of the control unit 69 is fixed on the plate 58 above the opening 68 by the bolts 66. The control unit is similar to that described in connection with the triple valve B. It comprises the base 69 having the hollow body 70 bolted thereon. The top of the body 70 is closed by the cover 71. The diaphragm 72 is interposed between the body 70 and the cover 71. The outlet pipes 73 and 74 lead from the body 70 and the cover 71 respectively on opposite sides of the diaphragm 72. They are connected to the pipes 43 and 45 respectively which lead to the pipe 9 on opposite sides of the check valve 13. This provides normally equal pressures on the opposite sides of the diaphragm 72.

The disc valve 75 is connected to the diaphragm 72 by the stem 76. The valve is normally seated at 77 cutting off communication between the cavity 78 and the interior of the body 70. The passage 79 provides communication between the cavity 78 and the collapsible cup 64. The passage 80 leads off from the recess 78 and communicates with the atmosphere through the air cleaner 81. The seat 82 is adapted to be engaged by the valve 75 to cut off the passage 80 from communication with the recess 78.

The air brake control system operates substantially as follows:

The control valve E is operated in the usual manner to establish subatmospheric pressure in the pipe 57. This pressure will vary with the extent of the brake application desired. It is transmitted through the passages 56 and 54 to the space within the top 31 above the diaphragm 30. As previously described, atmospheric pressure is maintained below the diaphragm 30 when the system is in normal inoperative condition. The subatmospheric pressure in the region above the diaphragm 30 consequently expands the diaphragm upward and raises the plunger 35 attached thereto. The arm 36 then engages the cotter pin 38, lifting the stem 37, and unseating the disk valve 22.

Communication is provided between the power chamber A and the pressure reservoir C through the hose 7, the unseated valve 22, and the hose 8. As the pressure falls within the power chamber A, the diaphragm 3 contracts, pulling the rod 4, and swinging the lever 5 to apply the trailer brakes in the usual manner. The pressure in the reservoir C is maintained approximately constant during the application of the brakes by reason of its connection with the intake manifold 12 through the pipes 9 and 11.

Figure 3:
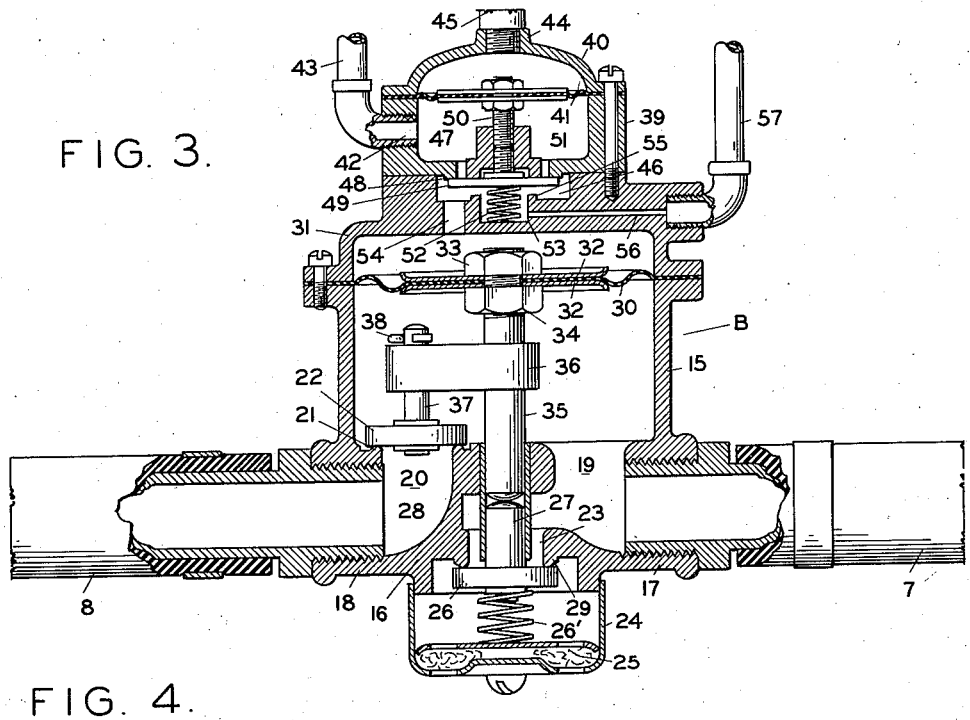
Fig. 3 is a vertical section of the triple valve controlling the application of the brakes.

When the absolute pressure within the power chamber A and the body 15 of the triple valve B falls to the pressure previously established in the pipe 57 by the operation of the control valve E, the diaphragm 30 recedes and assumes the position shown in Fig. 3 as soon as the pressure on its opposite sides becomes equal. This allows the valve 22 to drop down into engagement with its seat 21. The power chamber A is then cut off from communication with the reservoir C and has its pressure rendered constant. The brakes are thus held applied to an extent which depends upon the pressure which has been established in the pipe 57 by the operation of the control valve E.

Should it be desired to apply the brakes to an additional extent, the control valve E is operated to further reduce the absolute pressure in the pipe 57. The diaphragm 30 then again rises and unseats the valve 22, reestablishing communication between the power chamber A and the reservoir C. The absolute pressure within the power chamber A is then reduced until the pressure on the opposite sides of the diaphragm 30 becomes equal when the valve 22 is again seated.

To release the brakes, the valve E is operated to establish atmospheric pressure in the pipe 57. The diaphragm 29 then sinks into the region of subatmospheric pressure existing therebeneath. This causes the plunger 35 to push the stem 27 downward and unseats the valve 26. Atmospheric pressure then flows through the air cleaner 24, past the unseated valve 26, through the passage 23, into the body 15, and to the power chamber A. The increased pressure within the chamber A releases the brakes in the usual manner. When the pressure within the body 15 rises to atmospheric, the pressure on the opposite sides of the diaphragm 30 has become equal. The diaphragm then rises and assumes the position shown in Fig. 3 allowing the spring 26′ to close the valve 26. The system is now in normal released condition.

In the event of the trailer breaking away from the tractor, the couplings 10 and 57' between the tractor and the trailer are broken. The check valve 13 closes and prevents the escape of the subatmospheric pressure impounded within the reservoir C. It will be seen that the pipe 43 remains at the pressure of the reservoir C while the pipe 45 rises to atmospheric pressure. Atmospheric air then flows from the pipe 45 into the interior of the cover 40 above the diaphragm 41. The diaphragm is immediately depressed into the region of subatmospheric pressure existing therebeneath. This disengages the valve 49 from the seat 48 and seats it at 55. This cuts off the pipe 57 from communication with the interior of the top 31. The space above the diaphragm 30 now communicates with the reservoir C through the opening 47 and the pipe 43. The establishment of the subatmospheric reservoir pressure above the diaphragm 30 raises the plunger 35 unseating the valve 22 and allowing the chamber A to be evacuated until it reaches the pressure of the reservoir C, thus applying the trailer brakes to their fullest extent. The valve 22 cannot close until the pressure within the chamber A is thus reduced to the pressure of the reservoir, because the diaphragm 30 cannot assume the position shown in Fig. 3 until the pressure on its opposite sides has become equal.

As previously described, the pipes 73 and 74 are connected to the pipes 43 and 45 respectively. Thus breaking the coupling 10 also allows the flow of atmospheric air into the interior of the cover 71. The pipe 73 remains at the subatmospheric pressure of the reservoir C. The diaphragm 72 is consequently depressed, and unseats the disk valve 75 from its seat 77, and engages it against the opposed seat 82. This cuts off the interior of the collapsible cup 64 from communication with the atmosphere through the passages 79 and 80 and the air cleaner 81. The collapsible cup is evacuated by its communication with the reservoir C, through the passage 79, past the valve seat 77, and through the pipe 73. The collapse of the cup 64 due to its evacuation raises the pawl 60 into engagement with the ratchet teeth 63 in the pull rod 4. The trailer brakes are thus locked while applied to their fullest extent.

Should there be a slow leak in the trailer brake system, the diaphragm 3 of the power chamber A will yield and begin to release the trailer brakes. However, after a very slight movement of the pull rod 4, one of the ratchet teeth 63 will engage the nose of the pawl 60, thus positively preventing any further movement of the rod 4 and holding the brakes in their fully applied position.

The ratchet teeth 63 are undercut. The pawl 60 is thus locked against disengaging therefrom. Consequently, even though the pressure within the reservoir C might rise to atmospheric, the condition of the trailer brakes would be unaffected, since continuance of the evacuated condition of the collapsible cup 64 is now unnecessary to maintain the pawl 60 engaged in the ratchet teeth 63.

When the tractor is again coupled to the trailer, the valve E is operated to apply the brakes fully. The rod 4 then moves to the left slightly. This releases the nose of the pawl 60 from locked engagement with the undercut ratchet teeth 63 and enables the spring 67' to expand and completely disengage the pawl 60 from the ratchet teeth.

The emergency locking device is capable of use as convenient means for locking the trailer brakes when parking. To this end the plug valve D is interposed between pipes 11 and 11' leading to the intake manifold 12. This valve is illustrated in detail in Fig. 5. It consists of the body 85 having the tapered plug 86 therein. The port 87 provided through the plug 86 normally allows unobstructed flow of air through the valve.

In locking the trailer brakes for parking, the brakes are first applied in the usual manner by the operation of the valve E which controls the triple valve B in the manner thereinbefore described. The plug 86 is then rotated by the handle 88 (see Fig. 1) to remove the port 87 from registry with the outlets of the body 85. The groove 89 provides communication between the atmospheric port 90 and the pipe 11'. This permits the flow of atmospheric air into the pipe 11' as far as the check valve 13, which automatically closes. This is tantamount to breaking the coupling 10 since it establishes atmospheric pressure in the pipe 74 and operates the brake lock exactly in the manner it was operated in the case of the trailer breaking away as above described.

Figure 5:
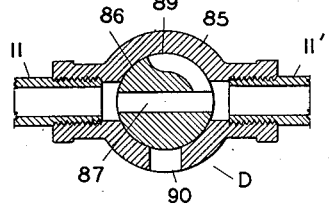
Fig. 5 is a horizontal section of the valve for manually controlling the operation of the brake lock.

The parking lock is released by restoring the plug valve D to its initial position illustrated in Fig. 5, and then fully applying the trailer brakes by operation of the control valve E. This allows release of the pawl 60 from the undercut ratchet teeth 63.

Having thus described the invention, what is claimed and desired to be secured by Letters Patent is:

1. A power brake system including a source of fluid pressure; a pressure reservoir; a means connecting said reservoir to said source; means for preventing loss of pressure from said reservoir through the connecting means; fluid pressure means for actuating the brakes connected with said reservoir; a valve interposed between said actuating means and said reservoir; means for locking said brake actuating means in operative position; control means connected to said coupling and adapted to open said valve and to operate said locking means when the pressure in said connecting means falls below a given point.

2. A power brake system for tractor and trailer combinations including a source of subatmospheric pressure on said tractor; a pressure reservoir on said trailer; breakable means connecting said reservoir with said source; means for preventing loss of pressure from said reservoir through said connecting means; brake actuating means operatively connected with said reserve tank; a valve interposed between said brake actuating means and said reservoir; means controlled by the fluid pressure in said breakable connecting means, adapted to open said valve should said connecting means be broken; means for locking said brake actuating means in operative position; and means adapted to operate said locking means should said coupling be broken.

3. A power brake system for tractor and trailer combinations including a source of subatmospheric pressure on said tractor; a pressure reservoir on said trailer; breakable means connecting said reservoir to said source; means for preventing loss of pressure from said reservoir through said connecting means; brake actuating means operatively connected to said reservoir; a valve interposed between said actuating means and said reservoir; means for opening said valve should said connecting means be broken; means for locking said brake actuating means in operative position; means connected to said reservoir and adapted to be actuated by pressure therefrom to operate said locking means; and a control valve interposed between said lock operating means and said reservoir and adapted to be opened by the breaking of said connecting means.

4. A power brake system for tractor and trailer combinations including a source of subatmospheric pressure on said tractor; a pressure reservoir on said trailer; breakable means connecting said reservoir to said source; means for preventing loss of pressure from said reservoir through said breakable connecting means; brake actuating means operatively connected with said reservoir; a valve interposed between said actuating means and said reservoir; pressure controlled means for opening said valve; means for admitting pressure from said reservoir to said pressure controlled means should said connecting means be broken; means for locking said brake actuating means in operative position; pressure operated means for actuating said locking means; means for admitting pressure from said reservoir to said lock actuating means and rendered operative by the change of the pressure in said breakable connecting means to atmospheric; and a valve on said tractor adapted to cut off said breakable connecting means from communication with said pressure source and adapted to admit atmospheric pressure to said connecting means.

5. A power brake system for tractor and trailer combinations including a source of subatmospheric pressure on said tractor; a pressure reservoir on said trailer; a breakable coupling connecting said reservoir to said source; a check valve interposed between said reservoir and said coupling and adapted to prevent loss of pressure from said reservoir through said coupling; brake actuating means connected to said reservoir; a valve interposed between said brake actuating means and said reservoir; means for opening said valve should the pressure in said coupling become atmospheric; means for locking said brake actuating means in operative position; fluid pressure operated means adapted to actuate said locking means; a diaphragm having the pressure from opposite sides of said check valve exerted against its opposite surfaces; and means for admitting pressure from said reservoir to said pressure means, operated by the movement of said diaphragm under a pressure differential exerted thereagainst.

6. A power brake system for tractor and trailer combinations including a source of subatmospheric pressure on said tractor; a reservoir to said source; means for preventing loss of pressure from said reservoir through said coupling; brake actuating means connected to said reservoir; a valve interposed between said reservoir and said brake actuating means; means for opening said valve should said coupling be broken; a pawl adapted to lock said brake actuating means in operative position; means for locking said pawl in engagement with said brake actuating means should said brake actuating means begin to move toward release position; subatmospheric pressure means for actuating said pawl; and means operated by the breaking of said coupling for admitting subatmospheric pressure from said reservoir to said pressure means.

7. A power brake system including a source of subatmospheric pressure, a pressure reservoir; means connecting said reservoir with said source and having a breakable coupling associated therewith; means for preventing loss of pressure from said reservoir through said coupling; subatmospheric pressure means connected with said reservoir for actuating the brakes; a valve interposed between said actuating means and said reservoir; means for locking said brake actuating means in operative position; control means adapted to open said valve and operate said locking means when the pressure in said coupling falls below a given point.

DUDLEY F. SEARLE.